United States Patent [19]
Stone

[11] Patent Number: 5,369,227
[45] Date of Patent: Nov. 29, 1994

[54] STYLUS SWITCH STATUS DETERMINATION IN A DIGITIZER TABLET HAVING A CORDLESS STYLUS

[75] Inventor: Thomas L. Stone, Beacon Falls, Conn.

[73] Assignee: Summagraphics Corporation, Austin, Tex.

[21] Appl. No.: 918,579

[22] Filed: Jul. 22, 1992

[51] Int. Cl.⁵ .............................................. G08C 21/00
[52] U.S. Cl. ......................................... 178/18; 178/19
[58] Field of Search ...................... 178/18, 19; 345/179

[56] References Cited

U.S. PATENT DOCUMENTS

| 4,672,154 | 6/1987 | Rodgers et al. | 178/19 |
| 4,786,765 | 11/1988 | Yamanami et al. | 178/19 |
| 4,902,858 | 2/1990 | Yamanami et al. | 178/19 |
| 5,049,862 | 9/1991 | Dao et al. | 178/18 |
| 5,138,118 | 8/1992 | Russell | 178/19 |

Primary Examiner—Stephen Chin
Assistant Examiner—Paul Loomis
Attorney, Agent, or Firm—Rosen, Dainow & Jacobs

[57] ABSTRACT

A digitizer tablet with a cordless transducer which is capable of providing to the tablet information relating not only to the position of the pointing device but also with respect to the status of any button switches on the transducer. This is obtained by providing a plurality of oscillators, connected in circuits in which the relative ratio of the signal frequency outputs of the oscillators can be varied in response to activation of a switch while at the same time the sum of the amplitudes of the oscillating signals remain constant. Thus, the determination of the sum can be used as a indication of the position of the pointing device with respect to the tablet, whereas by determining the differences in the signal intensities of the different frequency oscillating signals, it is possible to determine the status of the button switches on the pointing device. The invention is typically used with a stylus or cursor driven tablet.

23 Claims, 4 Drawing Sheets

STYLUS SWITCH STATUS DETERMINATION IN A DIGITIZER TABLET HAVING A CORDLESS STYLUS

RELATED APPLICATION

Co-pending, commonly-assigned patent application, Ser. No. 07/780,758, filed Oct. 18, 1991, entitled "Digitizer Tablet with Cordless Pointing Device," now pending.

BACKGROUND OF THE INVENTION

This invention relates to position determining systems, such as digitizer tablets, and to pointing devices of such tablets, and in particular to digitizer tablets in which the pointing device typically in the form of a stylus or cursor is free of any cable or other electrical wire connection to the tablet itself.

Digitizer tablets employing a cordless pointing device, e.g. a stylus or cursor, for simplicity referred to herein as a stylus, are already known in the art. The major advantage is that the absence of the cable or electrical cord connection between the stylus and the tablet facilitates its use by the user. In a cordless system, one way of conveying information to the tablet is by way of transmitted electrical signals that induce signals in the conductors of the typical tablet grid that can be processed and interpreted by the tablet. The information can also include the status of any switches within or on the stylus. Information concerning the status of different switches could be conveyed with electrical signals at different frequencies. could be conveyed with electrical signals at different frequencies.

A digitizer tablet in use is typically connected to a host computer such as a PC which includes a monitor. The monitors of such computers radiate signals that may interfere with the operation of the digitizer tablet, particularly a digitizer tablet that uses electromagnetic or electrostatic coupling of the stylus to the conductors of the grid structure in the tablet.

To accommodate a stylus which uses a number of frequencies to convey switch status or other information, the tablet signal processor must have a relatively wide bandwidth, which makes the tablet more prone to noise and electromagnetic interference compared to a tablet processor with a narrow bandwidth.

SUMMARY OF THE INVENTION

An object of the invention is an improved cordless pointing device for a position-determining system.

A further object of the invention is a digitizer tablet employing a cordless pointing device which is less subject to noise and/or electromagnetic interference.

Another object of the invention is a digitizer tablet employing a cordless pointing device capable of providing switch status information to the tablet while providing good noise immunity.

Another object of the invention is a digitizer tablet employing a cordless pointing device in which the pointing device is capable of transmitting to the tablet not only position information but also switch status information and in which the tablet is capable of receiving and processing that information with a narrow bandwidth receiver to provide increased noise immunity.

In accordance with one aspect of the invention, the stylus employs two independent oscillators which are capable of generating signals at two different frequencies. The two signals at different frequencies generated by the oscillators are summed, and that summed value is coupled to the tablet grid conductors inducing signals therein. The induced signals are processed in the tablet employing two separate filters that can be made extremely noise immune by having a tight bandwidth. Each filter is for processing one of the two frequency signals generated by the stylus and received by the tablet. The output from each of these filters can be processed in order to yield a value representative of the strength or other parameter of the received signals. The relative strengths of the received signals at the two different frequencies is employed as the way of distinguishing the kind of information that is being transmitted by the stylus.

In accordance with another aspect of the invention, inside the stylus is provided a network which upon activation of one or more switches alters the ratio of the amplitudes of the two signal frequencies being generated. At the tablet receiving end, therefore, a comparison of the strength of each of the detected signal frequencies would provide the information that would represent what the stylus is conveying to the tablet. In this aspect of the invention, it is preferred for the processing of the signals to include an A to D converter so that the signals detected at the different frequencies can be represented by a digital value. This feature would make it easier to compare the relative strengths of the received signals.

In accordance with still a further feature of the invention, the means in the stylus for altering the ratio of the amplitudes of the generated signal frequencies upon activation of the switches are such that the sum of the amplitudes of both signals remains a constant. For instance, assuming that the summed amplitudes has a value of one, then upon the activation of one button, half the amplitude would be provided by one frequency and the remaining half by the other frequency. Or, upon the activation of button switches on the stylus, one third of the amplitude can be provided by the first frequency and two thirds by the second frequency, or one quarter and three quarters, etc. Thus, it is relatively simple in this way to determine from the relatively large amplitude changes of the different frequency signals which of the buttons on the stylus have been activated. Put another way, it becomes a relatively simple task to map the detected signal amplitudes of the different frequency signals to the status of the button or other switches on the stylus. An important aspect of this feature is that the sum of the received signal amplitudes of the two different frequency signals does not change when the stylus switches are activated.

In accordance with still a further feature of the invention, switch status can easily be extracted from the received signals by subtracting the magnitudes of the two received signals yielding a different difference for each combination of switch activations. By determining the ratio of the difference between the two magnitudes to the sum of the magnitudes, the switch or button information or status becomes independent of signal strength variations caused by the position of the stylus with respect to the tablet. Therefore, the position determination signal represented by the sum and the button status signals represented by the differences are integrated in such a manner that neither causes a deterioration of the other. The advantages are high noise immunity, a circuitry of relatively low complexity, and very simple transducer circuitry.

Still another feature of the invention is the provision of a relatively simple power-down circuit which is constructed to shut-off the power driving the oscillators in the battery-powered pointing device if a switch has not been activated within a preset interval.

The invention will now be described in greater detail with respect to certain preferred embodiments in connection with the accompanying drawings, but it is to be understood that the invention is not to be limited to the details of the preferred embodiments which follow hereinafter.

DETAILED DESCRIPTION OF PREFERRED EMBODIMENTS

Figure 1:
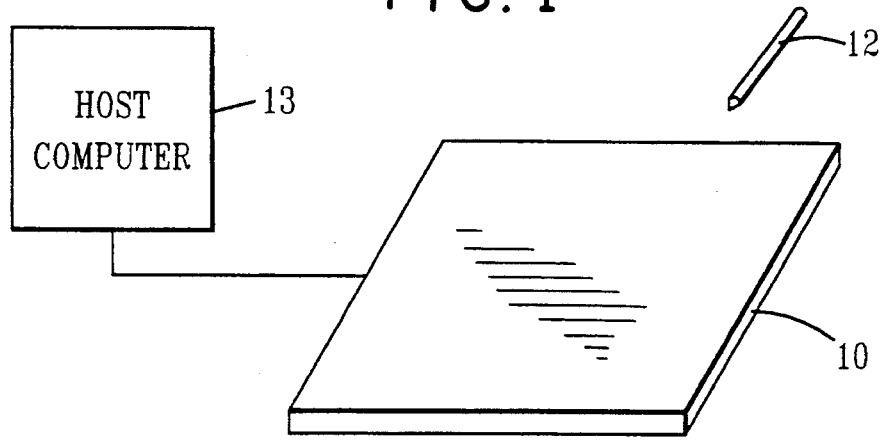
FIG. 1 is a perspective view of a digitizer tablet of a type well-known in the art and representing one embodiment of the invention.

FIG. 1 is a perspective view of a digitizer tablet of a type well known in the art which shows in generally schematic form a generally flat rectangular member 10 constituting the tablet itself within which but not shown in this drawing are embedded the usual X and Y electrode or grids for interacting with a pointing device, preferably using electromagnetic or electrostatic technology. A cooperating stylus is shown at 12 and differs from that used in a conventional tablet only in that it is not connected or hooked up by a cable or an electrical wire to the tablet 10. The processing electronics in the tablet for the signals are generally mounted on the conventional printed circuit board containing the X and Y orthogonal electrode systems inside the tablet. This is all well known in the art and need not be described in any further detail. The tablet 10 is typically connected to a host computer 13 for displaying the patterns or other icons representing the location of stylus 12 with respect to the tablet.

In a typical system, the grid conductors are electrically scanned in a desired scanned sequence while the stylus is driven to generate an RF signal. The stylus tip acts as an electrostatic signal source, capacitively coupling the RF signal to the tablet conductors. This induces signal voltages in the grid conductors when the pointing device is held over the grid conductors. The intensity of that induced signal is a function of the position of the pointing device with respect to the conductor which at that time is being scanned. The processing, which again is conventional, is usually to amplify the signals picked up from the scanned conductors, low-pass filter them to reduce noise and other interference, and then convert them to a digital value which is stored in an array mapped to the various conductors in each of the grids. Typically, the strongest signal is picked up when the pointing device is closest to the grid conductor then being scanned, which provides a course position for the X and Y coordinates of that pointing device, and typically the fine position of the pointing device is determined by interpolation using the intensity of the signals induced when the adjacent grid conductors are scanned. Again, this is all well known in the art and a further description is unnecessary.

Figure 2:
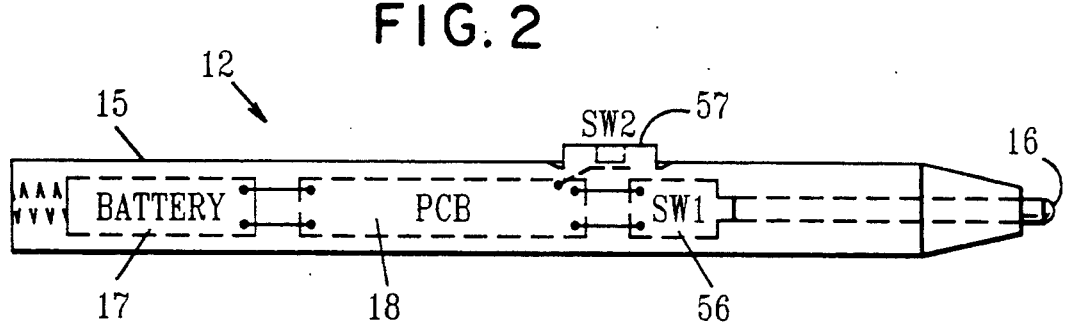
FIG. 2 is a schematic side view of one form of a stylus for use with the digitizer tablet of the invention.

FIG. 2 shows a pointing device in the form of a stylus. While in the description that follows hereinafter the reference will most often be made to a stylus, it is understood that the invention is not limited to a stylus as the pointing device but extends also to pointing devices of the cursor type which lie flat on the tablet surface and are provided with optical devices to improve accuracy of positioning.

Figure 3:
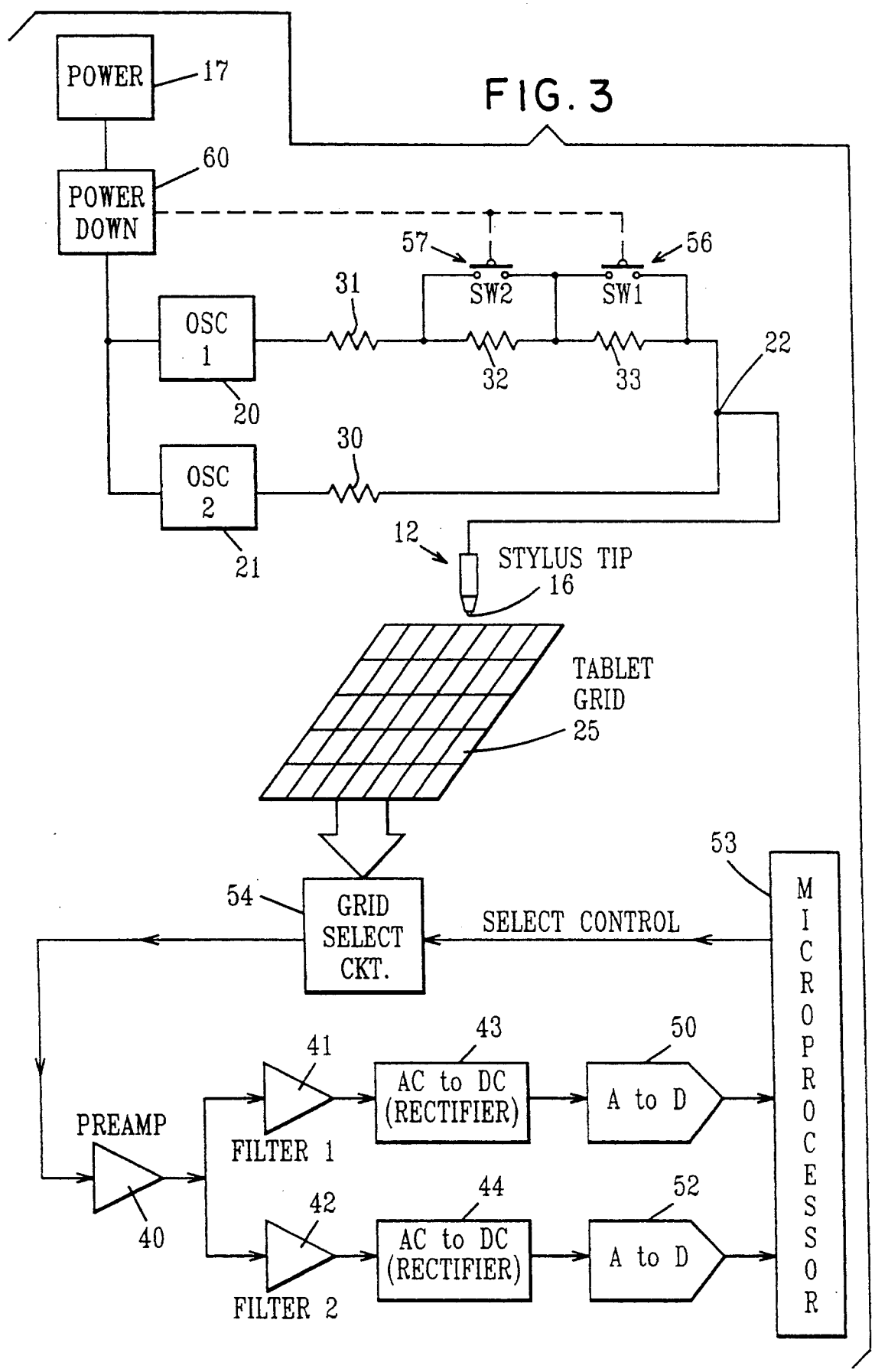
FIG. 3 is a circuit schematic of a preferred form of circuitry in the stylus and tablet of the embodiment of FIG. 1.

The stylus illustrated in FIG. 2 contains a housing 15 similar to that of a ball point pen with a metal tip 16 projecting from the bottom which acts as a transmitter or radiator. At the opposite end of the stylus housing is located a battery 17 used to power the electronics included within the stylus on a PCB 18. As shown in FIG. 3, that electronics includes, typically in the form of an integrated circuit, two 20, 21 oscillators at different frequencies. The values chosen for the frequencies are not that critical. Typical values would be, for example, 75 kHz for one oscillator and 100 kHz for the other oscillator. Preferably oscillators are used that are crystal-controlled in a conventional manner. Alternatively, a single oscillator can be provided and the output connected to a binary counter to derive a second frequency, which in this case would be at half the frequency.

The signals generated by the two oscillators are summed at a node 22 and supplied to the stylus tip 16 and the resultant signal is then radiated. Since stylus tip 16 is usually within a half inch or so of the top of tablet, then the conductors of the grids, shown schematically at 25, in the tablet will be in a position to intercept the signal with the result that a voltage will get electrostatically induced in the conductors whose values will depend in the usual way upon the location of the stylus tip 16 with respect to each of the conductors. The induced signals are then processed, generally speaking in a normal way, except that the two oscillating frequencies are separated from one another for purposes that will be explained in further detail below. One of the oscillators can be provided, connected to its output, with a plurality of, for example, resistors some of which are connected in parallel with a switch, the switch SW2 in this case representing a typical button switch on the body of the stylus. The typical stylus contains an additional internal switch SW1 activated by pressing the stylus tip 16 on the tablet surface in parallel with a second resistor. The addition of those resistors to the output circuit of that oscillator acts to attenuate the intensity of its signal. As had been explained in the introduction of the specification, it is the differences in the intensities of the two oscillating frequencies that will be used to indicate which or which combination of switches and buttons has been activated.

Figure 5:
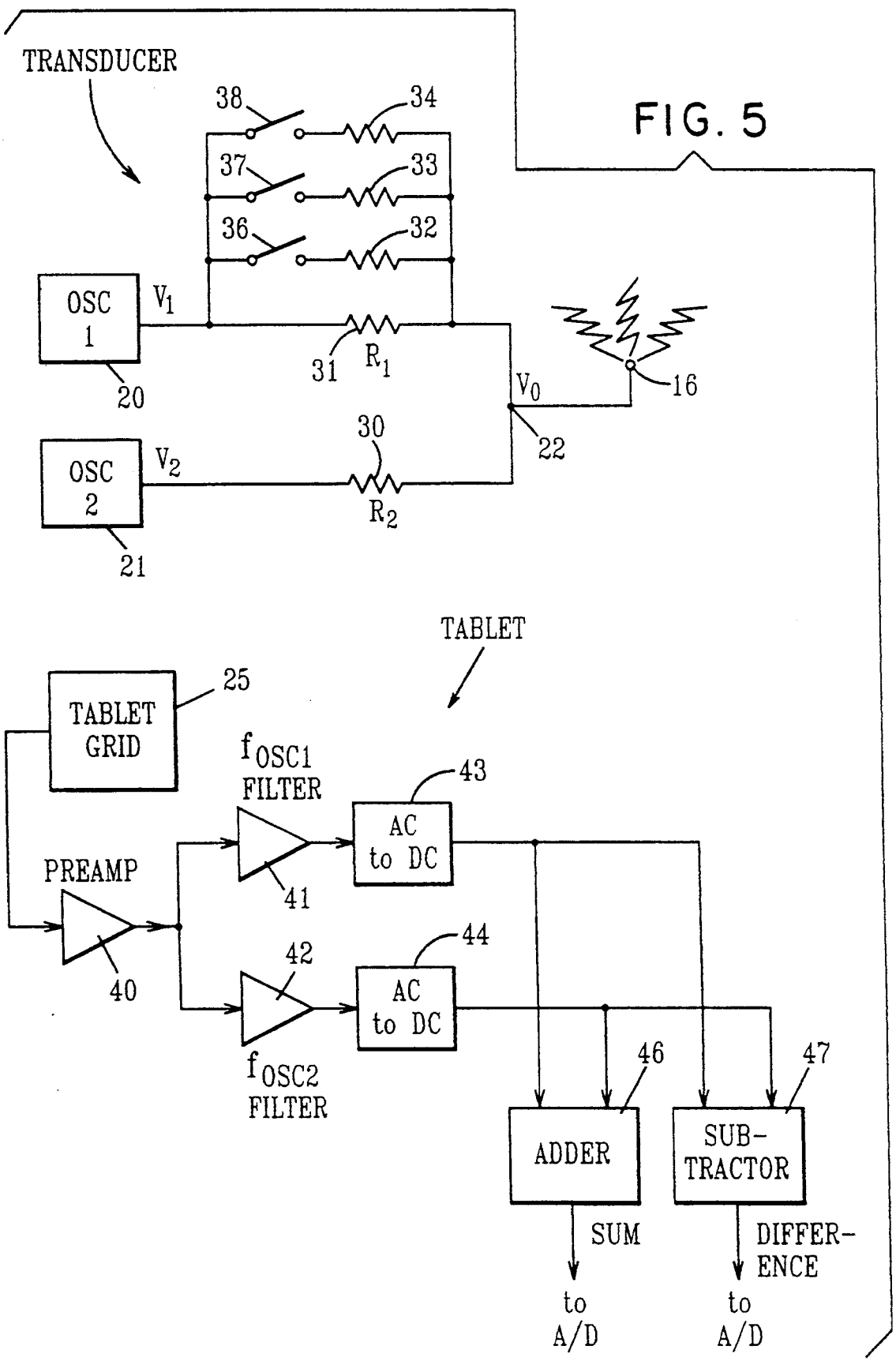
FIG. 5 is a circuit schematic and block diagram of circuitry in the stylus and tablet according to another embodiment of the invention.

While the circuit shown in FIG. 3 shows series resistors bypassed by switches, the invention is not limited thereto and also includes the resistors being in parallel with a switch in series with each resistor, which will now be described in connection with FIG. 5, with the same reference numerals used as in FIG. 3 to designate similar elements or components. In FIG. 5, the stylus or transducer is shown represented at the top by battery-powered oscillator 20 and oscillator 21 each of which generates a signal whose intensity is represented by $V_1$ and $V_2$, shown at the output of each of the oscillator blocks. As previously mentioned, each of the oscillators can be a conventional crystal controlled oscillator. The output of the second oscillator OSC2 is connected through a resistor 30, also labelled $R_2$, which is connected to the node 22 labelled $V_0$. The output of oscillator OSC1 is in turn connected through a resistor 31 to the same node 22, but in the case of the latter, there are three other resistors 32, 33, 34 each connected in series with a switch 36, 37, 38, all of which are in parallel with the resistor 31. The effective resistance of that network 31 ... 34 is indicated by $R_1$. If we assume that $R_1$ equals $R_2$, then with all of the switches open as shown, the value of the output signal at node 22 represented by $V_0$ would be a voltage containing two frequency components with each, which can easily be obtained by appropriate adjustment of the oscillators, representing one half the signal amplitude of the output wave. The equation defining the value of the signal radiated is:

$$V_0 = \frac{V_1 R_2}{R_1 + R_2} + \frac{V_2 R_1}{R_1 + R_2} \quad (1)$$

As will be evident, when a button switch is depressed, and one or two additional resistors are placed in parallel with resistor 31, then the effective attenuating impedance $R_1$ is diminished. Those additional resistors can easily be chosen so that the effect on the output voltage $V_0$ is to simplify the detection of a switch activation. So, for example, if with no switches activated, the signal amplitudes are contributed half by each of the oscillators 20, 21, then when one switch is depressed the effect could be to reduce the amplitude of the signal contributed by OSC1 depending upon the value of that added resistor. If a second switch is depressed, then the changed value of $R_1$ would again change the relative magnitude of the amplitudes produced at the outputs of the two oscillators, and finally, it would be possible by closing all three switches simultaneously to obtain a third variation of relative signal amplitudes. An important factor is that the circuit is configured such that the sum of the signal amplitudes for any configuration of open and closed switch situations remains a constant and therefore the sum represented by the value $V_0$ can be used for position determination of the stylus, as the induced signals will not be effected by the condition of the switches. This result is achieved when the sum is a function of just the output voltages $V_1$ plus $V_2$ independent of the resistors $R_1$ and $R_2$.

On the other hand, as is evident from the foregoing description, what is changing when the switches are closed are the differences in the relative amplitudes of the oscillating signal outputs and the value of that difference will be a function of the value of resistors $R_1$ and $R_2$ and thus will enable simple detection of the status as to which of the switches on the stylus are open or closed. In contrast, therefore, to the summed signals which remains constant for any configuration of open and closed switches, the difference now is directly related to the configuration of those open and closed button switches.

The circuit shown in FIG. 5 below that of the stylus schematically represents that present in the tablet. As is usual the signals induced in the scanned conductors is processed through a preamplifier 40. At that point, in the normal tablet, the signal would be filtered and then typically full-wave rectified to provide a value which can be used to indicate the distance of the stylus from the particular grid conductor being scanned at that time.

However, in the present invention, two bandpass filters 41, 42 are provided following the preamplifier of the signal. The bandpass filters 41, 42 have a relatively narrow bandpass designed so that they will pass primarily only the signal of the first oscillator OSC1 or of the second oscillator OSC2. For the example previously given of 75 and 100 kHz frequency oscillators, a typical bandpass characteristic for the 75 kHz filter 42 would be 73-77 kHz, and for the 100 kHz filter 41 would be 96-104 KHz, typically 10 kHz or less. But it will be understood that the invention is not limited to these particular values. These two filters effectively separate the two signal frequencies and each can then be processed in a more or less normal way but in separate channels. Thus, for example the AC signals could then each be full-wave rectified 43, 44 to provide a DC value which is then processed as shown, while still in analog form, through conventional adder 46 and subtractor 47 circuits, and the resultant sum and difference values converted by conventional A/D converters to digital values representative of the amplitudes of the sum and difference signals.

Preferably, however, as shown in FIG. 3, the separate signals at the different frequencies are first digitized and then their sum and difference values calculated. In either case, the digital value results are representative of the summed intensities of the two oscillating frequencies, as well as of the differences between the two oscillating frequencies. The sum value which represents the position information will remain substantially constant irrespective of the configuration of open and closed button whereas in contrast the differences will be directly related to the configuration of those switches.

The preferred arrangement in FIG. 3 shows the digitization in conventional convertors 50, 52, the outputs of which are then processed as described in the usual microprocessor 53 present in such tablets. FIG. 3 also shows, as is conventional, the microprocessor 53 controlling via conventional scanning circuitry 54 the scanning of the grid conductors which connects each in turn to the preamplifier 40.

The remaining processing is obvious to those of average skill in this art. The sum signal is treated in the normal way to determinate stylus position, and the difference signals are treated by passing same through an appropriate decoder whose outputs are mapped to switch or button status. In the specific example given in FIG. 3 using a stylus as the pointing device with two switches, a possibility of four different button conditions or states can be determined as a result of the various combinations of switch opens and closes. In this case (FIG. 2), SW1, referenced 56, corresponds to the usual internal switch activated when the pen tip 16 is pressed against the tablet. SW2, referenced 57, corresponds to a button switch on the side of the stylus 12. The third switch 38 shown in FIG. 5 can be represented by a second button switch on the stylus housing 15. Three switches would provide 8 possible switch states when none, or each switch alone, or each switch with one of the other switches, or all three switches are activated.

As earlier mentioned, the invention is not limited to this arrangement. For a cursor, which is conventionally provided with four buttons, a total of 16 states would be obtainable from the activation of one or more of the four buttons in a manner quite similar to what is described in connection with the one or two button stylus.

One of the unusual features of the invention is that the output voltage $V_0$ at the antenna 16 does not change, even though $R_1$ (which represents the single or combined value of all the resistors between the output of OSC1 and the node 22) does change. But this unusual result will become apparent from equation (1), which results from the fact that each oscillator output appears to the signal of the other oscillator as effectively RF ground.

An example using FIG. 5 will illustrate the point. We assume that $R_1 = R_2 = 100$ ohms, and that each of the resistors 32, 34 connected in series with a switch also has a value of 100 ohms. Assume further that the output voltages $V_1$ and $V_2$ are the same and are equal to 1. Now, with all switches 36–38 open, under these conditions $$V_0 = \frac{V_1 R_2}{R_1 + R_2} + \frac{V_2 R_1}{R_1 + R_2} = \frac{1 \times 100 + 1 \times 100}{200}$$

$$= \frac{200}{200} = 1 = \text{Sum}(V_1 + V_2).$$

The difference $(V_1 - V_2)$ would be $1 - 1 = 0$.

Now next assume that switch 36 is closed placing resistor 32 in parallel with 31. Thus, the effective value of $R_1$ falls to 50. Plugging the new values into equation (1) becomes:

$$V_0 =$$

$$\frac{V_1 R_2}{R_1 + R_2} + \frac{V_2 R_1}{R_1 + R_2} = \frac{1 \times 100 + 1 \times 50}{150} = \frac{150}{150} = 1.$$

So, the sum $(V_1 + V_2)$ remains equal to 1, but the difference now is $\frac{1}{3}$ (100/150 − 50/150); i.e., the signal contributed by OSC1 is twice the value of that contributed by OSC2. The difference is always a fraction. Hence, the desired result is achieved of a constant sum signal irrespective of differences in the respective RF signals.

A further advantage of maintaining the sum constant is that the difference values can be divided by the constant sum, the effect of which is to normalize the differences which improves processing and the determination of the correct switch status.

While the preferred embodiment employs just two oscillators for economical reasons, in principle the invention can be implemented with three or more oscillators connected to the common antenna 16.

In the description given so far, fixed resistors have been assumed. The invention is not limited to fixed resistors. At least one of the resistors can be a variable resistor, specifically, a force or pressure sensitive resistor connected to the tip or to a button. Pressure-sensitive transducers connected to a stylus tip are well known in the art and can be substituted for, for example, the switch SW1 of FIG. 2.

Figure 6:
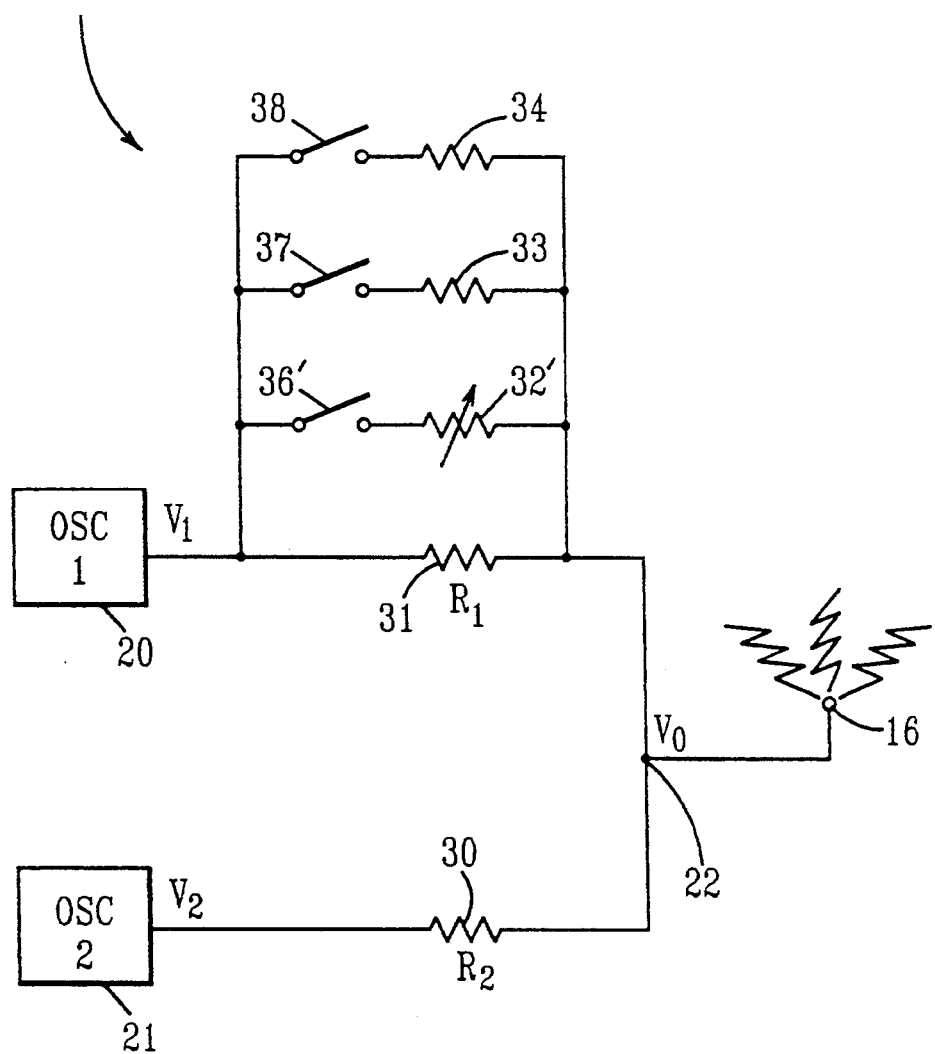
FIG. 6 is a circuit schematic of circuitry according to another embodiment of the invention in the stylus using a force-sensitive resistor.

This is illustrated in the partial schematic view of FIG. 6. The same reference numerals as in FIG. 5 are used except SW1, represented by numeral 36', is a force-sensitive device which varies the resistance 32' over a range of resistances, shown by the arrow. That switch 36' can be connected to the stylus tip. As the stylus tip pressure increases, the resistance 32' varies, thereby varying over a range the effective value of the resistance in series with OSC1. The operation would otherwise remain the same. The sum would remain constant, but the difference now would vary over a range as a function of the tip pressure and could be used by the tablet and its application as pressure information or as a Z-axis signal.

Figure 4:
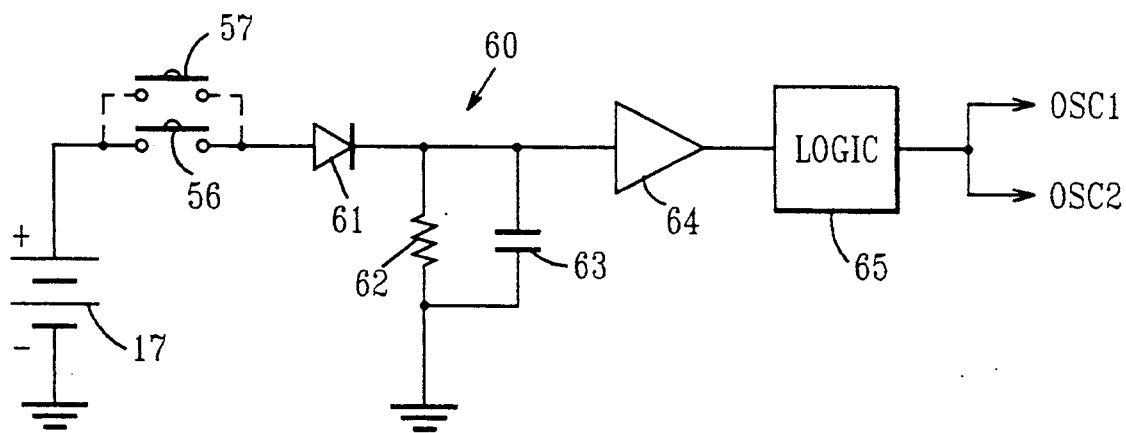
FIG. 4 is a circuit schematic illustrating one form of power-down circuit for use with the circuitry within the stylus.

Since the pointing device is powered by a battery, it is desirable to minimize battery drain when the device is not being used. Thus, FIG. 3 shows at 60 a power-down circuit connected between the battery 17 and the oscillators 20, 21. FIG. 4 illustrates a preferred form of such a circuit which is relatively inexpensive to implement. The battery 17 is connected in series with all of the switches 56, 57, in parallel arrangement, with a diode 61 to a charging capacitor 63 in parallel with a bleed-off resistor 62. The latter are connected to a voltage-sensitive circuit 64 whose output drives a logic circuit 65.

The operation is as follows. Any time a switch is closed, the capacitor 63 is charged to the battery voltage, which turns on circuit 64 and the logic circuit in turn supplies the battery power to the oscillators. When the depressed switch is released, the capacitor slowly discharges through the hi-valued resistor 62. In, say, 15 minutes, the capacitor voltage drops below the circuit 64 threshold, which turns off and/or turns off the logic circuit 65 thereby isolating the battery 17 from the system. The drain on the battery is effectively reduced by a factor of about 100, and its lifetime correspondingly increased. The power down circuit can also be added to the FIG. 5 embodiment.

The digitizer system and the conductor structures and systems illustrated in the drawings and described above are of the electrostatic type. However, the invention is not limited to such digitizers systems and such conductor structures and systems and can be applied to other types, such as an electromagnetic system. In the latter, the conductors of the conductor structure or grid are electrical conductors, the conductor in the movable element is a an inductor or coil, and the movable element reference point is the center of the coil.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A cordless pointing device for use with a position determining system, comprising:
   a switch having a manually changeable status; and
   means for generating signals which the position determining system uses to determine the position of said pointing device relative to a surface of the position determining system and the status of said switch; said signal generating means generating first and second signals at first and second different frequencies and a composite signal from said first and second signals which is receivable by the position determining system;

said signal generating means including means responsive to a change in status of said switch for altering a parameter of at least one of said first and second signals while maintaining a parameter of said composite signal substantially constant.

2. The cordless pointing device of claim 1, wherein said altering means in response to a change in status of said switch alters the relative magnitudes of said first and second signals while maintaining the magnitude of said composite signal substantially constant.

3. The cordless pointing device of claim 2, further comprising means associated with the position determining system for receiving said composite signal and measuring the relative magnitudes of said first and second signals, the status of said switch being related to said relative magnitudes.

4. A digitizing system comprising:
a digitizing tablet and a cordless pointing device,
said cordless pointing device having a switch and signal generating means for generating signals used by said tablet to determine the position of said pointing device relative to said tablet and the status of said switch,
said signal generating means comprising plural signal sources providing output signals at different signal frequencies, means for providing a sum signal which is the sum of the magnitudes of said output signals, and means for altering the relative magnitudes of said output signals without substantially altering the magnitude of said sum signal, the relative magnitudes of said output signals being related to the status of said switch,
said pointing device including means for transmitting said sum signal to said tablet, and
said tablet including means for receiving said sum signal from said cordless pointing device and determining therefrom the switch status and the position of said pointing device relative to said tablet.

5. The system of claim 4, wherein said means of said tablet includes means for separating said sum signal received from said cordless pointing device into signals corresponding to said signals of different frequency generated by said signal generating means, and means for determining said switch status from the relative magnitudes of the separated signals, the status of said switch being related to said relative magnitudes of the separated signals.

6. The system of claim 4, wherein said transmitting means comprises a common signal radiator coupled to said the plural signal sources.

7. The system of claim 6, comprising a resistance connected in series between one of said signal sources and the signal radiator, and wherein said means for altering includes means for changing the value of said resistance.

8. The system of claim 5, wherein said determining means includes an adder coupled to receive the separated signals.

9. The system of claim 8, wherein said determining means includes a subtractor coupled to receive the separated signals.

10. A digitizing system comprising:
a digitizing tablet, and
a pointing device free of any cable or electrical wire connection to the tablet, comprising means for generating a plurality of signals at a plurality of different frequencies, at least one switch connected to vary the magnitude of at least one of the plurality of signals upon a change in the status of the switch, means for combining the signals of different frequencies and means for radiating the combined signal to the tablet,
said digitizing tablet comprising means for receiving the combined signal radiated by said radiating means, separating the received combined signal into signals corresponding to those generated at the different frequencies by said generating means and means for determining a change in magnitude of one of the signals, said change in magnitude being related to the status of said switch.

11. The system of claim 10, further comprising means coupled between said signal generating means and said radiating means for attenuating said signals generated by said signal generating means.

12. The system of claim 11, wherein said attenuating means comprises a plurality of discrete attenuators arranged in parallel in a signal path of one of said signals between said signal generating means and said radiating means.

13. The system of claim 12, further comprising plural switches, each connected in series with one of said discrete attenuators to connect and disconnect a respective discrete attenuator in and out of said signal path in response to a change in status of the respective switch, whereby the magnitude of said one signal is changed in response to a change in status of said switches.

14. The system of claim 13, wherein said discrete attenuators comprise discrete resistors.

15. The system of claim 12, wherein said means of said digitizing tablet comprises separate signal paths for the separated signals, and means for adding the signals in the separate signal paths, and using the added signal to obtain the position of the pointing device relative to the tablet.

16. The system of claim 15, further comprising means for subtracting the magnitudes of the signals in the different the status of the switches on the pointing device.

17. The system of claim 10, further comprising a battery in the pointing device for powering the signal generating means.

18. The system of claim 17, further comprising a power-down circuit connected between the battery and the signal generating means.

19. The system of claim 18, wherein said power-down circuit includes a capacitor connected to be charged whenever the status of a switch of said pointing device is changed, and means responsive to a voltage of said capacitor for connecting the battery to the signal generating means.

20. The system of claim 10, wherein the means for altering comprises a force-sensitive transducer.

21. The system of claim 20, wherein the force-sensitive transducer comprises a force-sensitive resistor connected to a tip on the pointing device.

22. A method of operating a digitizer tablet with a cordless pointing device having one or more switches to provide to the tablet information relating both to the position of the pointing device relative to the tablet and to the status of the switches on the pointing device, comprising:
providing first and second signals at different frequencies,
coupling the pointing device switcher such that a change in status of a switch varies the relative magnitudes of the first and second signals, radiating the first and second signals from the pointing device in a given status of the switch, and
detecting the first and second radiated signals and determining the status of the switch from the relative magnitudes of the detected signals.

23. The method of claim 22, further comprising adding the detected signals and using the sum of the detected signals for deriving the position of the pointing device relative to the tablet.

* * * * *

UNITED STATES PATENT AND TRADEMARK OFFICE
CERTIFICATE OF CORRECTION

PATENT NO. : 5,369,227
DATED : November 29, 1994
INVENTOR(S) : Thomas L. Stone

It is certified that error appears in the above-indentified patent and that said Letters Patent is hereby corrected as shown below:

Column 1, lines 32-33, delete "could be conveyed with electrical signals at different frequencies."

Column 10, line 39 (Claim 16, line 3), after "different" insert --channels to obtain a value indicative of--.

Column 10, line 66 (Claim 22, line 9), change "switcher" to "switches".

Signed and Sealed this

Twenty-first Day of March, 1995

Attest:

BRUCE LEHMAN

*Attesting Officer*     *Commissioner of Patents and Trademarks*